(12) United States Patent
Dinant

(10) Patent No.: US 9,707,886 B2
(45) Date of Patent: Jul. 18, 2017

(54) ADJUSTABLE FOG LAMP ON MOTOR VEHICLE FRONT BUMPER

(71) Applicant: VALEO VISION BELGIQUE, Meslin l'Eveque (BE)

(72) Inventor: Franck Dinant, Virginal (BE)

(73) Assignee: Valeo Vision Belgique, Meslin l'Eveque (BE)

( * ) Notice: Subject to any disclaimer, the term of this patent is extended or adjusted under 35 U.S.C. 154(b) by 148 days.

(21) Appl. No.: 14/635,218

(22) Filed: Mar. 2, 2015

(65) Prior Publication Data

US 2015/0251589 A1    Sep. 10, 2015

(30) Foreign Application Priority Data

Mar. 4, 2014    (FR) ...................... 14 51769

(51) Int. Cl.
| | |
|---|---|
| *B60Q 1/00* | (2006.01) |
| *B60Q 1/26* | (2006.01) |
| *B60Q 1/06* | (2006.01) |
| *B60Q 1/20* | (2006.01) |
| *B60Q 1/28* | (2006.01) |
| *B60Q 1/30* | (2006.01) |
| *F21V 5/04* | (2006.01) |
| *F21V 13/04* | (2006.01) |

(52) U.S. Cl.
CPC ............. *B60Q 1/2642* (2013.01); *B60Q 1/06* (2013.01); *B60Q 1/20* (2013.01); *B60Q 1/2661* (2013.01); *B60Q 1/28* (2013.01); *B60Q 1/30* (2013.01); *F21V 5/04* (2013.01); *F21V 13/04* (2013.01)

(58) Field of Classification Search
CPC .......... B60Q 1/2642; B60Q 1/06; B60Q 1/20; B60Q 1/2661; B60Q 1/28; B60Q 1/30; F21V 5/04; F21V 13/04
USPC ........................................................ 362/505
See application file for complete search history.

(56) References Cited

U.S. PATENT DOCUMENTS

| | | | |
|---|---|---|---|
| 8,272,764 | B2 | 9/2012 | Son |
| 8,894,246 | B2 | 11/2014 | Son |
| 2002/0075696 | A1* | 6/2002 | Storck ...................... B60Q 1/20 362/523 |
| 2010/0079075 | A1 | 4/2010 | Son |
| 2012/0051070 | A1* | 3/2012 | Bakacha .............. B60Q 1/0041 362/464 |
| 2012/0300409 | A1* | 11/2012 | Lee .......................... F21V 29/20 361/721 |
| 2012/0320598 | A1 | 12/2012 | Son |
| 2015/0043215 | A1 | 2/2015 | Son |

FOREIGN PATENT DOCUMENTS

| | | |
|---|---|---|
| EP | 1285812 A1 | 2/2003 |
| EP | 1450099 A2 | 8/2004 |
| JP | 2004217092 A | 8/2004 |

* cited by examiner

*Primary Examiner* — Ali Alavi
(74) *Attorney, Agent, or Firm* — Jacox, Meckstroth & Jenkins

(57) ABSTRACT

A lighting and/or signaling module that includes a housing delimiting a volume intended to receive at least one light source, an outer lens disposed on the housing and delimiting the volume and means for supporting the housing in rotation about a generally transverse axis. The outer lens has an exterior surface of revolution about the rotation axis. The module is preferably a fog lamp mounted on a vehicle front bumper. Bumper includes on its rear face means for fixing the lamp.

26 Claims, 3 Drawing Sheets

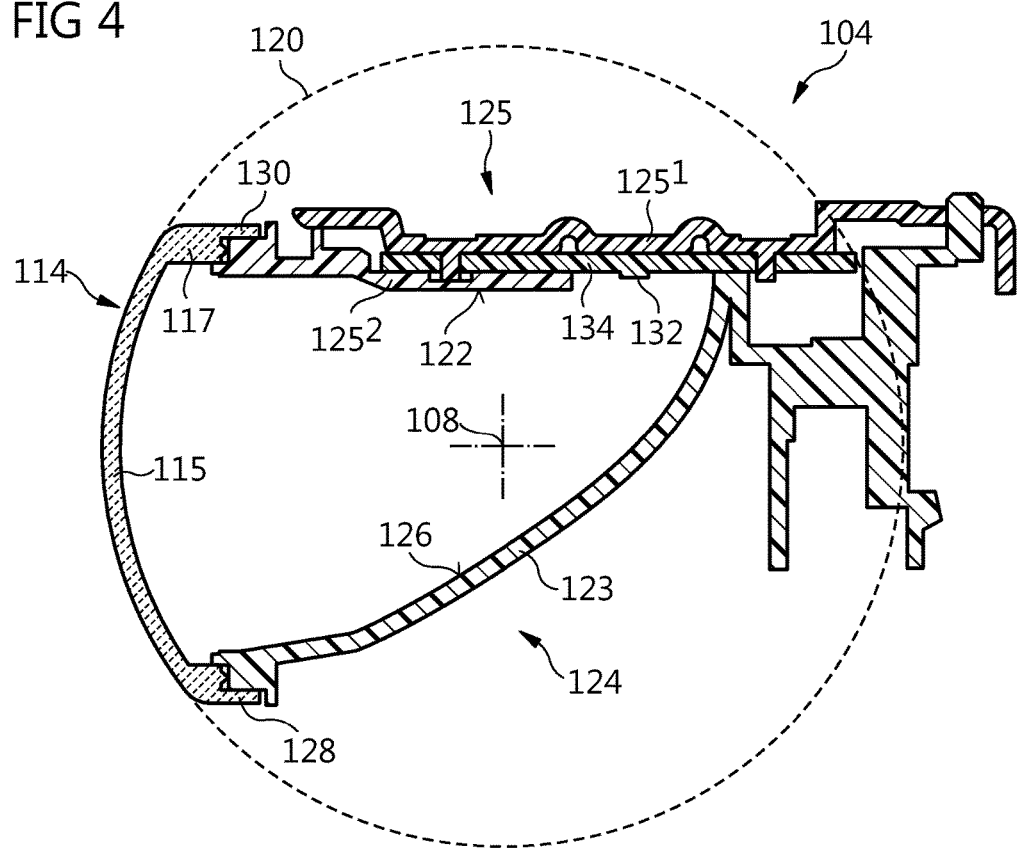

ADJUSTABLE FOG LAMP ON MOTOR VEHICLE FRONT BUMPER

CROSS-REFERENCE TO RELATED APPLICATIONS

This application claims priority to the French application No. 1451769 filed on Mar. 4, 2014, which application is incorporated herein by reference and made a part hereof.

BACKGROUND OF THE INVENTION

1. Field of the Invention

The invention relates to the field of motor vehicle lighting and/or signaling lamps. The invention relates more particularly to the field of lighting and/or signaling lamps integrated into a motor vehicle front or rear bumper.

2. Description of the Related Art

The published patent document JP 2004-217092 A discloses the mounting of a fog lamp on the rear face of the wall of a front bumper. The mounting provides means for adjustment of the beam in an essentially vertical direction. This adjustment modifies the inclination of the lamp relative to the bumper by pivoting about an axis essentially corresponding to the flexible portion of a fixing lug of the lamp, situated at a lower position on the lamp. As a function of the adjustment that will be effected, the exterior surface of the outer lens of the lamp will be further away from or nearer the contour of the opening in the wall of the bumper. This distance is subject to the accumulation of waste coming from the road, liable to block the beam partly and/or to exert forces on the lamp. Moreover, the means for fixing the lamp lack stiffness in this respect.

SUMMARY OF THE INVENTION

One objective of the invention is to propose a lighting and/or signaling lighting module for motor vehicles, more particularly intended to be mounted behind a mask such as a front or rear bumper, which alleviates at least one of the disadvantages referred to above. The invention has the more particular objective of proposing a lighting and/or signaling lighting module intended to be disposed behind a mask, such as a motor vehicle front or rear bumper, the module being adjustable with optimum retention on the mask.

The invention consists in lighting module, notably for a lighting and/or signaling device, including a housing delimiting a volume intended to receive at least one light source; an outer lens fixed to the housing and closing the volume; means for supporting the module adapted to allow rotation of the module about a generally transverse axis; noteworthy in that the outer lens includes a transparent or translucent main portion, the exterior surface of the main portion being a portion of a surface of revolution about the rotation axis.

Lighting module is advantageously able to provide a statutory fog lamp function.

The module advantageously includes a reflector for forming a beam intended to be emitted from the module, the housing and the reflector being formed in one piece.

By surface of revolution is meant a surface generated by the revolution about an axis of a curve referred to as the generatrix. By way of nonlimiting example, this may be a sphere, a circular cylinder, a circular hyperboloid or a circular ellipsoid.

In accordance with one advantageous embodiment of the invention, the rotation axis crosses the volume of the housing.

In accordance with one advantageous embodiment of the invention, the rotation axis is situated at a distance from a transverse axis of inertia that is less than 25%, preferably 15% of the mean diameter of the maximum cross section of the module. The distance may be equal to or close to zero.

In accordance with one advantageous embodiment of the invention, the exterior surface of the main portion of the outer lens extends over a sector between 10° and 120°, preferably between 20° and 90°.

In accordance with one advantageous embodiment of the invention, the transverse profile of the exterior surface of the main portion of the outer lens is rectilinear. In other words, the generatrix of the surface of revolution is a straight line segment. In this case, this surface of revolution is a circular cylinder about the rotation axis of the module.

In accordance with one advantageous embodiment of the invention, the transverse profile of the exterior surface of the main portion of the outer lens is generally convex or concave from a viewing point situated in front of the surface.

In accordance with one advantageous embodiment of the invention, the housing includes at least one wall notably extending along the transverse axis, the wall including a generally plane first portion and a concave second portion notably extending along a generally parabolic profile from one end of the first portion.

By generally plane portion is meant a portion the section of which has no or negligible variations of thickness or amplitude compared to the length of the portion.

In accordance with one advantageous embodiment of the invention, the first portion of the wall of the housing supports at least one light source. The first portion of the wall of the housing supports the light source directly or indirectly. The light source may be a light-emitting diode (LED).

In accordance with one advantageous embodiment of the invention, the light source or sources is or are disposed on a plate including electrical power supply tracks, the plate being disposed in a recess in the first portion of the wall of the housing.

In accordance with one advantageous embodiment of the invention, the first portion of the housing includes a first part extending from the second portion of the housing and a second part extending between the first part and the outer lens, partly covering the first part, the second part preferably being attached to the first part.

Where appropriate, the first part is generally plane and extends toward the outer lens and the second part is generally plane and extends toward the second portion of the housing.

In accordance with one advantageous embodiment of the invention, the light source or sources is or are disposed on a plate including electrical power supply tracks, the plate extending partly between the first and second parts of the first portion of the housing.

Where appropriate, the first part features at least one pin and the second part features at least one opening, the pin of the first part passing through an orifice in the plate to be inserted into the opening of the second part so as to hold the plate in position in the housing and to position the light source at a focus of the second portion of the housing. In accordance with one advantageous embodiment of the invention, the second portion of the wall of the housing is covered with a reflective surface configured to reflect the rays emitted by the light source or sources as a predetermined statutory lighting and/or signaling beam passing through the outer lens. The beam formed by the reflective surface may be definitively formed after reflection, that is to say that this beam complies with all statutory requirements imposed on it, without intervention of any supplementary optical means. Alternatively, at least one supplementary optical means, for example a lens, may be provided for modifying the beam reflected by the surface.

In accordance with one advantageous embodiment of the invention, the outer lens includes a holding portion extending from at least a part, or even the whole, of the perimeter of the main portion of the outer lens.

In accordance with one advantageous embodiment of the invention, the holding portion of the outer lens is generally aligned with the first portion of the housing.

In accordance with one advantageous embodiment of the invention, the holding portion of the outer lens supports first fixing and/or positioning means adapted to cooperate with second fixing and/or positioning means supported by the first portion of the wall of the housing.

In accordance with one advantageous embodiment of the invention, the holding portion of the outer lens is an opaque portion including a reflective surface on its interior face. The reflective surface has an esthetic role enabling prevention of observation from outside the module of the fixing or electrical connection elements. The reflective surface therefore has no optical role in relation to the beam emitted by the module.

Alternatively, the module may include a mask, notably reflective, the mask cooperating both with the first fixing and/or positioning means supported by the outer lens and with the second fixing and/or positioning means supported by the first portion of the wall of the housing. Where appropriate, the mask has both an esthetic role whilst having no optical role and a role of fixing and/or positioning the outer lens on the module.

Alternatively, the holding portion has a length that is negligible compared to its width. This feature offers the advantage of preventing rays coming from the source passing through this holding portion, being deflected in an undesirable manner, and thus interfering with the beam produced by the module.

In accordance with one advantageous embodiment of the invention, the support means are disposed on the housing of the module, notably on two side walls of the housing of the module.

The invention also relates to a motor vehicle front bumper, including a wall for protection of the vehicle, with an exterior face and an interior face and at least one orifice, and a lighting module fixed to the interior face of the wall facing the orifice; noteworthy in that the lighting module is in accordance with the invention.

In accordance with one advantageous embodiment of the invention, the lighting module is fixed to the interior face so that it is mobile in rotation, notably so as to allow angular adjustment of the module.

In accordance with one advantageous embodiment of the invention, the wall of the bumper forms a rearwardly directed recess around the orifice.

In accordance with one advantageous embodiment of the invention, the exterior surface of the main portion of the outer lens is at an essentially constant distance from the contour of the orifice on the interior face of the wall of the bumper. The distance is constant whatever the angular orientation of the module. This distance is preferably less than or equal to 5 mm. It may be close to zero, or even zero.

In accordance with one advantageous embodiment of the invention, the exterior surface of the main portion of the outer lens extends, relative to the transverse axis of the module, over a sector greater than that of the orifice in the wall, so as to cover the whole of the orifice with the outer lens over a range of angular adjustment of the module about the transverse axis, the range preferably being greater than 5°, more preferably greater than 10°.

In accordance with one advantageous embodiment of the invention, the wall of the bumper includes on its interior face means for fixing the module cooperating with the means for supporting the housing of the module, the fixing and support means being configured to allow manual angular adjustment of the module and immobilization of the module.

In accordance with one advantageous embodiment of the invention, the fixing means on the wall of the bumper include means for clamping the means for supporting the housing of the module.

In accordance with one advantageous embodiment of the invention, the means for supporting the housing are journals and the fixing means on the wall of the bumper are bearings, preferably of the cap type.

In accordance with one advantageous embodiment of the invention, the orifice or orifices has or have a generally elongate shape along the transverse axis of the module or modules.

The provisions of the invention are beneficial in that they enable the front face of the outer lens to maintain a constant clearance with the fixed part of the mask that surrounds it, which fixed part can in this instance be a bumper or bumper face bar. The fact of providing the rotation axis in the vicinity of the transverse axis of inertia of the module is particularly beneficial in this context because this allows simple and robust mounting of the module. This imposes a small radius of curvature on the outer lens, for example less than 100 mm, even 50 mm, which is appropriate for modules of small size such as the fog lamps. Moreover, the increased curvature of the outer lens increases its resistance to impact, which is also advantageous.

These and other objects and advantages of the invention will be apparent from the following description, the accompanying drawings and the appended claims.

BRIEF DESCRIPTION OF THE ACCOMPANYING DRAWINGS

Other features and advantages of the present invention will be better understood in the light of the description and the drawings, in which:

FIG. 4 is a sectional view taken along the line III-III of the bumper and the lighting module in accordance with a second embodiment of the invention.

DETAILED DESCRIPTION OF THE PREFERRED EMBODIMENTS

Figure 1:
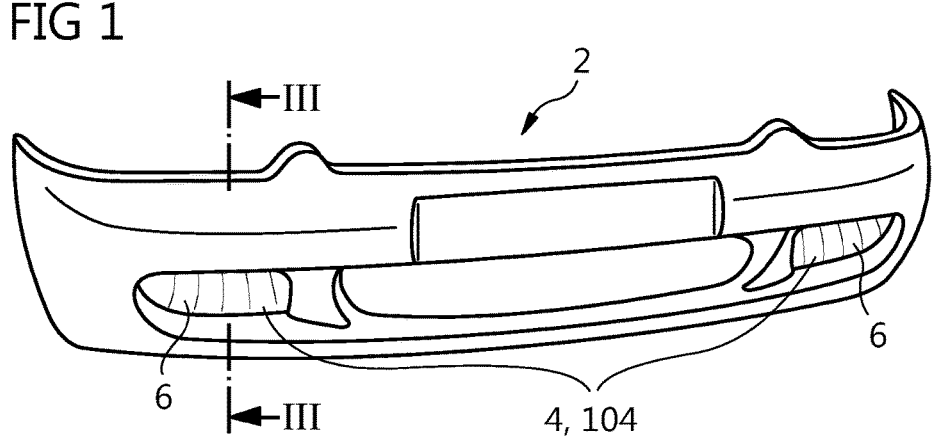
FIG. 1 is a general view of a vehicle front bumper in accordance with the invention, including two orifices behind which are disposed lighting modules in accordance with the invention.

FIG. 1 shows a front bumper or bumper face bar 2 in accordance with the invention. It includes a protective wall provided with two orifices 6 behind which are disposed fog lamps 4 or 104. The orifices 6 and the fog lamps 4 or 104 are disposed at low positions of the bumper face bar 2 so as to optimize the lighting in the presence of fog.

Figure 2:
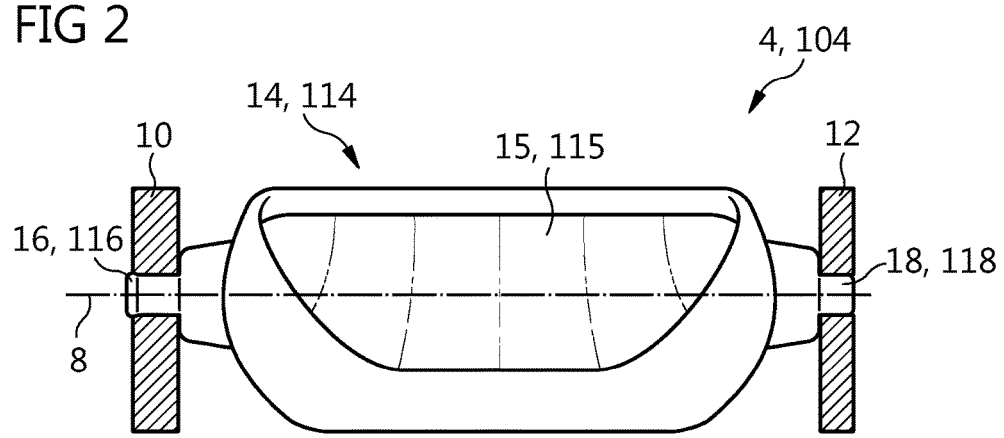
FIG. 2 is a front view of a lighting module in accordance with the invention and means for fixing it to the bumper.

FIG. 2 is a front view of one of the fog lamps 4 or 104 of the bumper face bar 2 from FIG. 1. The fog lamp 4 or 104 includes a transparent outer lens 14 or 114 through which the beam produced by the fog lamp 4 or 104 is transmitted. The transparent outer lens 14 or 114 is mounted on a housing (not visible in FIG. 2) essentially corresponding to the rear part of the fog lamp 4 or 104 and supporting the journals 16 and 18 serving as means for supporting the housing in rotation about an axis 8. This axis 8 extends essentially transversely to the vehicle. The journals 16 and 18 cooperate with respective bearings 10 and 12 joined to the wall of the bumper face bar 2. These bearings 10 and 12 may be of the cap type, that is to say with a removable part that can be held in place by means of clamping screws.

The fog lamp 4 or 104 shown in FIGS. 1 and 2 extends essentially in the transverse direction. It may nevertheless have other shapes, such as a less elongated or more elongated shape, for example.

The transparent outer lens 14 or 114 has a transparent main portion 15 or 115 corresponding to the area with the vertical lines in FIG. 2 and a secondary portion corresponding to the area free of vertical lines surrounding the transparent main portion 15 or 115. It can be seen that the transparent main portion 15 or 115 can have a complex contour, in this instance a lower contour the ends of which are rounded to the point of rising as far as the upper contour. This contour is an example, other contours being equally envisageable.

Figure 3:
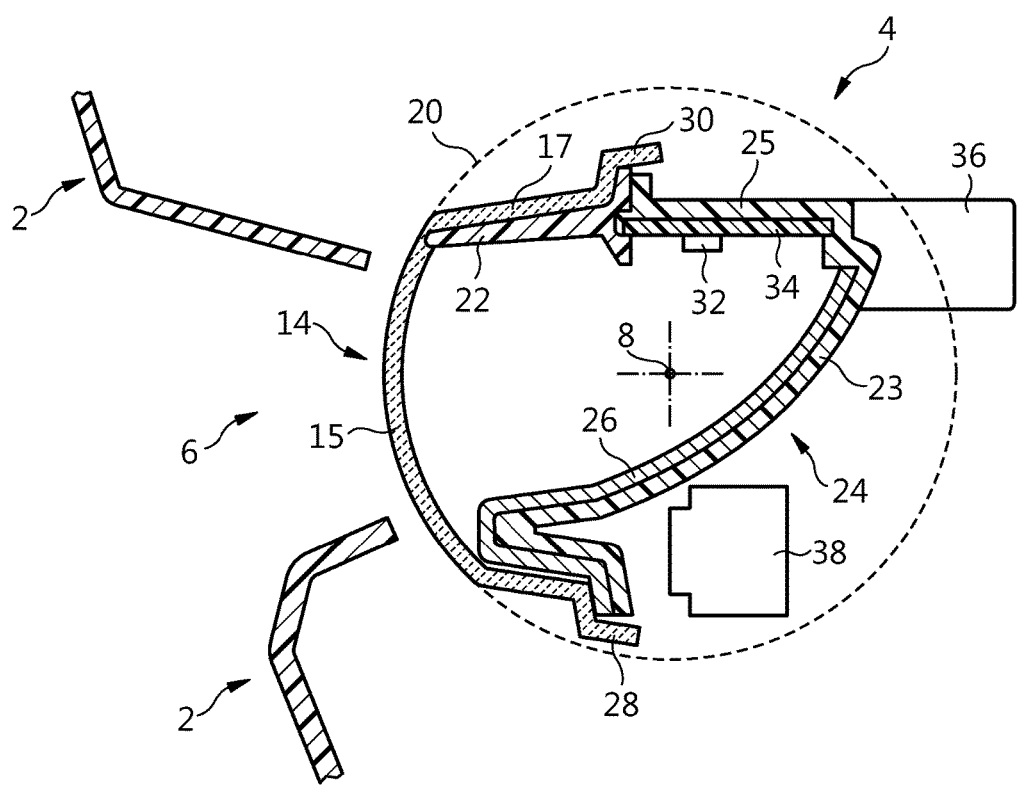
FIG. 3 is a sectional view taken along the line III-III of the bumper and the lighting module in accordance with a first embodiment of the invention.

FIG. 3 is a sectional view taken along the line III-III in FIG. 1 of the bumper face bar 2 from FIG. 1. The section is situated essentially at the center of the fog lamp 4 or 104 in the transverse direction. There can clearly be seen in it the orifice 6 present in the wall of the housing of the bumper face bar 2. The orifice 6 moreover forms a recess so that the contour of the orifice 6 on the rear face of the bumper face bar 2 is formed by the edge surface of the wall of the bumper face bar 2. In other configurations, the wall may nevertheless have other shapes, such as a curved shape, for example.

The transparent outer lens 14 or 114 and the housing 24 of the fog lamp 4 or 104 is clearly visible in FIG. 3. The housing 24 essentially includes a generally flat horizontal first portion 25 and a second portion 23 extending along a parabolic profile from the rear edge of the first portion 25. A plate 34 with electrical power supply tracks is disposed against the internal face of the first portion 25 of the housing 24. The plate 34 in question supports a light source 32 of the light-emitting diode (LED) type. The plate 34 is electrically connected to a connector 36 disposed at a position at the rear of the housing 24. The internal face of the second portion 23 of the housing 24 is covered by a reflective coating 26. The latter may be molded at the same time as the housing 24. The light rays emitted by the light source or sources are reflected by the reflective coating 26 so as to form a lighting beam.

The transparent outer lens 14 or 114 includes a transparent or translucent main portion 15 or 115, the exterior surface of which is a surface of revolution about the axis 8. It also includes an upper portion 17 generally aligned by the first portion 25 of the housing 24. The internal face of this upper portion 17 is covered with a reflective coating 22. The latter may be molded at the same time as the transparent outer lens 14 or 114. The benefit of this reflective coating 22 is to reflect the rays reflected by the reflector 26 toward this surface. In the absence of this reflective surface, these rays would otherwise be essentially absorbed and therefore lost.

The transparent outer lens 14 or 114 includes at each of its upper and lower edges a shoulder 28 and 30 serving as positioning means relative to the housing 24.

The fog lamp 4 or 104 may also include a fan 38 intended to force a flow of air into the volume of the housing 24 of the fog lamp 4 or 104, with a view to cooling the light source or sources and all the components of the fog lamp 4 or 104 in the vicinity of these light sources liable to become heated.

The profile of the transparent main portion 15 or 115 of the transparent outer lens 14 or 114 traces an arc the corresponding circle 20 of which is represented in dashed line in FIGS. 3 and 4. It can be seen, on the one hand, that this circle 20 encloses the greater part of the fog lamp 4 or 104 and, on the other hand, that the majority of the circle 20 is occupied by the fog lamp 4 or 104. This amounts to saying that the axis of inertia of the fog lamp 4 or 104 is close to the pivot or rotation axis 8, or even coincides with this pivot or rotation axis 8. The pivot or rotation axis 8 is preferably situated at a distance from a transverse axis of inertia that is less than 25%, preferably 15%, of the mean diameter of the maximum cross section of the module.

During assembly of the vehicle, in particular during assembly of the bumper face bar 2 and the fog lamps 4 or 104 to the vehicle, the fog lamps 4 or 104 may be adjusted manually on the assembly line. To do this, it suffices for the operative to manipulate the means for fixing the fog lamps 4 or 104 on the bumper face bar 2, notably by means of a tool for driving a clamping screw at the level of the means for fixing it to the bumper face bar 2. The distance between the exterior surface of the transparent outer lens 14 or 114 and the contour of the orifice 6 remains constant. A seal may moreover be provided on the contour of the orifice 6, this seal cooperating with the exterior surface of the transparent outer lens 14 or 114.

The profile of the transparent main portion 15 or 115 of the transparent outer lens 14 or 114 in a horizontal plane may be essentially rectilinear or curved. In the case of a curved profile, it may be essentially convex or concave from a viewing point situated in front of the surface. In other words, this means that the transparent main portion 15 or 115 of the transparent outer lens 14 or 114 may be barrel-shaped or diabolo-shaped.

FIG. 4 corresponds to FIG. 3, although the module conforms to a second embodiment of the invention. The reference numbers of the first embodiment are used in the second embodiment for the same or corresponding elements, except that these numbers are increased by 100 in order to distinguish clearly between the two embodiments. Reference is furthermore made to the description of the first embodiment. Specific numbers between 100 and 200 are used for specific elements.

The second embodiment, shown in FIG. 4, is distinguished from the first embodiment essentially in that the retaining portion 117 of the outer lens 114 is substantially shorter. To this end, the first portion 125 of the wall of the housing 124 includes a first portion $125^1$ extending directly from the second portion 123 of the wall of the housing 124, forming the reflector, to a second part $125^2$ preferably attached to and extending the latter. To this end, the second part $125^2$ partly covers the free end of the first part $125^1$. The plate 134 is disposed against the first part $125^1$ and has its front edge sandwiched between the first part $125^1$ and the second part $125^2$.

Compared to the first embodiment, the retaining portion 117 no longer includes a reflective coating. The second part $125^2$ of the first portion 125 of the wall of the housing 124 may include a reflective coating 122 on its interior face. The first part $125^1$ may include at least one pin, preferably a plurality of pins, for positioning the plate 134 and possibly for positioning the second part $125^2$.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A lighting module for a lighting and/or signaling device, including:
    a housing delimiting a volume intended to receive at least one light source;
    an outer lens fixed to said housing and closing said volume;
    a support for rotatably supporting said lighting module to allow rotation of said lighting module about a generally transverse axis that is generally transverse to an optical axis of said lighting module;
    wherein said outer lens includes a transparent or translucent main portion, an exterior surface of said transparent or translucent main portion being a portion of a surface of revolution generally corresponding to an arc of an imaginary circle with an axis of inertia of said lighting module being close to said generally transverse axis;
    said support enabling said lighting module to be rotated to a desired position at which said lighting module may be fixed and after fixation, said at least one light source may transmit light through said transparent or translucent portion.

2. The lighting module according to claim 1, wherein said generally transverse axis crosses said volume of said housing.

3. The lighting module according to claim 2, wherein said generally transverse axis is situated at a distance from said axis of inertia that is less than 25% of a mean diameter of a maximum cross section of said lighting module.

4. The lighting module according to claim 2, wherein a transverse profile of said exterior surface of said transparent or translucent main portion of said outer lens is rectilinear.

5. The lighting module according to claim 2, wherein a transverse profile of said exterior surface of said transparent or translucent main portion of said outer lens is generally convex or concave from a viewing point situated in front of said exterior surface.

6. The lighting module according to claim 2, wherein said generally transverse axis is situated at a distance from said axis of inertia that is less than 15% of a mean diameter of a maximum cross section of said lighting module.

7. The lighting module according to claim 1, wherein said housing includes at least one wall, notably extending along said generally transverse axis, said at least one wall including a generally planar first portion and a concave second portion notably extending along a generally parabolic profile, from one end of said generally planar first portion.

8. The lighting module according to claim 7, wherein said generally planar first portion of said housing includes a first part extending from said concave second portion of said housing and a second part extending between said first part and said outer lens, partly covering said first part, said second part preferably being attached to said first part.

9. The lighting module according to claim 7, wherein said outer lens includes a retaining portion extending from at least part, or even the entirety, of a perimeter of said transparent or translucent main portion of said outer lens.

10. The lighting module according to claim 9, wherein said retaining portion of said outer lens is generally aligned with said first portion of said at least one wall of said housing.

11. The lighting module according to claim 9, wherein said retaining portion of said outer lens supports a first fixing and/or positioning means adapted to cooperate with a second fixing and/or positioning means supported by said generally planar first portion of said at least one wall of said housing.

12. The lighting module according to claim 7, wherein said generally planar first portion of said at least one wall of said housing supports at least one light source.

13. The lighting module according to claim 12, wherein said concave second portion of said at least one wall of said housing is covered by a reflective surface configured to reflect rays emitted by said at least one light source as a predetermined statutory lighting and/or signaling beam passing through said outer lens.

14. The lighting module according to claim 12, wherein said generally planar first portion of said housing includes a first part extending from said concave second portion of said housing and a second part extending between said first part and said outer lens, partly covering said first part, said second part preferably being attached to said first part.

15. The lighting module according to claim 12, wherein said outer lens includes a retaining portion extending from at least part, or even the entirety, of a perimeter of said transparent or translucent main portion of said outer lens.

16. A motor vehicle front or rear bumper, including a wall for protection of the vehicle, with an exterior face and an interior face and at least one orifice, and a lighting module fixed to said interior face of said wall facing said at least one orifice; wherein said lighting module is of claim 1.

17. The motor vehicle front or rear bumper according to claim 16, wherein said wall of said motor vehicle front or rear bumper includes on its interior face a fixation for fixing said lighting module cooperating with said support for supporting said housing of said lighting module, said fixation and said support being configured to allow manual angular adjustment of said lighting module and immobilization of said lighting module.

18. The motor vehicle front or rear bumper according to claim 16, wherein said exterior surface of said transparent or translucent main portion of said outer lens extends, relative to said generally transverse axis of said lighting module, over a sector greater than that of said at least one orifice in said wall, so as to cover the whole of said at least one orifice with said outer lens over a range of angular adjustment of said lighting module about said generally transverse axis, said range of angular adjustment being preferably greater than 10°.

19. The motor vehicle front or rear bumper according to claim 16, wherein said exterior surface of said transparent or translucent main portion of said outer lens is at an essentially constant distance from a contour of said at least one orifice on said interior face of said wall of said motor vehicle front or rear bumper.

20. The motor vehicle front or rear bumper according to claim 16, wherein said exterior surface of said transparent or translucent main portion of said outer lens extends, relative to said generally transverse axis of said lighting module, over a sector greater than that of said at least one orifice in said wall, so as to cover the whole of said at least one orifice with said outer lens over a range of angular adjustment of said lighting module about said generally transverse axis, said range of angular adjustment being preferably greater than 50°.

21. The motor vehicle front or rear bumper according to claim 16, wherein said lighting module is fixed to said interior face so that it is mobile in rotation, notably so as to allow angular adjustment of said lighting module.

22. The motor vehicle front or rear bumper according to claim 21, wherein said exterior surface of said transparent or translucent main portion of said outer lens is at an essentially constant distance from a contour of said at least one orifice on said interior face of said wall of said motor vehicle front or rear bumper.

23. The motor vehicle front or rear bumper according to claim 21, wherein said exterior surface of said transparent or translucent main portion of said outer lens extends, relative to said generally transverse axis of said lighting module, over a sector greater than that of said at least one orifice in said wall, so as to cover the whole of said at least one orifice with said outer lens over a range of angular adjustment of said lighting module about said generally transverse axis, said range of angular adjustment being preferably greater than 50°.

24. The motor vehicle front or rear bumper according to claim 21, wherein said wall of said motor vehicle front or rear bumper includes on its interior face a fixation for fixing said lighting module cooperating with said support for supporting said housing of said lighting module, said fixation and said support being configured to allow manual angular adjustment of said lighting module and immobilization of said lighting module.

25. The lighting module according to claim 1, wherein a transverse profile of said exterior surface of said transparent or translucent main portion of said outer lens is generally convex or concave from a viewing point situated in front of said exterior surface.

26. The lighting module according to claim 1, wherein a transverse profile of said exterior surface of said transparent or translucent main portion of said outer lens is rectilinear.

\* \* \* \* \*

UNITED STATES PATENT AND TRADEMARK OFFICE
CERTIFICATE OF CORRECTION

PATENT NO. : 9,707,886 B2
APPLICATION NO. : 14/635218
DATED : July 18, 2017
INVENTOR(S) : Franck Dinant It is certified that error appears in the above-identified patent and that said Letters Patent is hereby corrected as shown below:

In the Claims

Column 8, Line 67, Claim 20 delete "50°" and insert --5°-- therefor.
Column 9, Line 20, Claim 23 delete "50°" and insert --5°-- therefor.

Signed and Sealed this
Fifth Day of September, 2017

Joseph Matal
*Performing the Functions and Duties of the*
*Under Secretary of Commerce for Intellectual Property and*
*Director of the United States Patent and Trademark Office*